United States Patent

[11] 3,621,457

[72] Inventor David W. Cuff
 Chepachet, R.I.
[21] Appl. No. 812,163
[22] Filed Apr. 1, 1969
[45] Patented Nov. 16, 1971
[73] Assignee American Optical Corporation
 Southbridge, Mass.

[54] UNITARY GLASS LASER SYSTEM WITH ASYMMETRICAL PUMPING
 11 Claims, 3 Drawing Figs.
[52] U.S. Cl. .................................................. 331/94.5
[51] Int. Cl. ..................................................... H01s 3/09,
 H01s 3/16
[50] Field of Search ........................................... 331/94.5

[56] References Cited
UNITED STATES PATENTS
3,284,722 11/1966 Gray........................... 331/94.5

*Primary Examiner*—Ronald L. Wibert
*Assistant Examiner*—R. J. Webster
*Attorneys*—William C. Nealon, Noble S. Williams and Robert J. Bird ABSTRACT: This specification discloses a glass laser structure comprising an integral assembly of an elongated matrix body of transparent material in which there is positioned a rod of glass laser material. An elongated flashlamp is also provided in the matrix body extending parallel to the laser rod. A section of transparent material adjacent to the side of the rod near the flashlamp has a lower index of refraction than the material of the laser rod. The remainder of the matrix has a higher index of refraction than the laser rod. Said transparent material may be made lossy for the wavelength at which the laser emits.

PATENTED NOV 16 1971    3,621,457

Inventor
DAVID W. CUFF

By Noble J. Williams
Attorney

UNITARY GLASS LASER SYSTEM WITH ASYMMETRICAL PUMPING

BACKGROUND OF THE INVENTION

In most laser applications, it is usually necessary or at least desirable to limit the spread of the laser beam produced by a laser. One way to minimize the beam spread in a glass-rod-type laser is to clad the laser rod with a layer of solid transparent material which selectively absorbs at the laser wavelength and has a higher index of refraction than the laser rod. As a result, laser emissions in the off-axial direction degenerate following interaction with the cladding material. Accordingly, only axial light is amplified by the laser rod and the beam spread is minimized.

Glass laser material is excited to a laser state in which it amplifies light by illuminating the laser material periodically with a high-intensity flashlamp. This operation of exciting the laser is called "pumping." If a glass laser rod is pumped asymmetrically, such as by a single flashlamp, then the side of the laser rod nearer the flashlamp will be heated to a greater degree than the side farther away from the flashlamp. An index of refraction gradient is produced from a temperature gradient in the rod generally such that the greater index occurs where the higher temperatures exist. Thus, in a rod which is pumped with a single flashlamp, the side of the rod nearer the flashlamp will have a greater index of refraction than the side of the rod further away from the flashlamp. As a result, laser light rays travelling through the laser rod parallel to the axis of the rod will be bent toward the side of the rod adjacent the flashlamp. In a laser system the laser rod is normally placed between two mirrors, which define the laser cavity. The laser light rays which travel through the rod parallel to the axis of the rod are reflected back through the rod by the mirrors. Because these rays are bent toward the side of the rod near the flashlamp, the rays after several passes through the rod will travel to the cladding surrounding the rod and be lost. For these reasons, the glass laser rod assemblies of the prior art employing only a single flashlamp for pumping or some other asymmetrical pumping arrangement and utilizing a transparent cladding of selectively absorptive material having a higher index of refraction than the laser rod are relatively lossy mechanisms and thus are inefficient in their operation.

SUMMARY OF THE INVENTION

The laser construction of the present invention overcomes this problem of bending of the light rays in the laser rod due to the thermal gradient therein by employing a cladding material which has a slightly lower index of refraction than the laser rod on the side of the rod adjacent to the flashlamp. The cladding material around the remainder of the rod has a slightly higher index of refraction. As a result, light which is travelling generally parallel to the axis of the rod and which is bent toward the side of the rod near the flashlamp will experience total internal reflection when it impinges upon the interface between the cladding and the rod. Upon being reflected the light will again be bent by the gradient in the index of refraction back to parallel with the rod axis and then again toward the side of the rod near the flashlamp to be reflected again. In this manner, the laser rays are trapped in the rod by the combined effects of bending due to the index of refraction gradient and the total internal reflection at the interface between the cladding and the laser rod. Since the remainder of the rod has cladding at a higher index of refraction, off-axis light will still be eliminated by either being lost immediately in the cladding or after making one bounce from the reflecting surface interface between the rod and the portion of the cladding having the lower index of refraction. As a result, the desired minimum beam spread in the laser beam produced by the system of the present invention is obtained.

Accordingly, an object of the present invention is to provide an improved glass rod laser system.

Another object of the present invention is to provide an improved glass rod laser system in which the glass rod is pumped asymmetrically.

A further object of the present invention is to improve the efficiency of a glass rod laser system which is asymmetrically pumped.

A still further object of the present invention is to overcome the problem of bending of the light rays in a glass rod laser due to the thermal gradient in the glass rod.

Further objects and advantages of the present invention will become readily apparent as the following detailed description of the invention unfolds and when taken in conjunction with the drawings.

DESCRIPTION OF THE PREFERRED EMBODIMENTS

Figure 1:
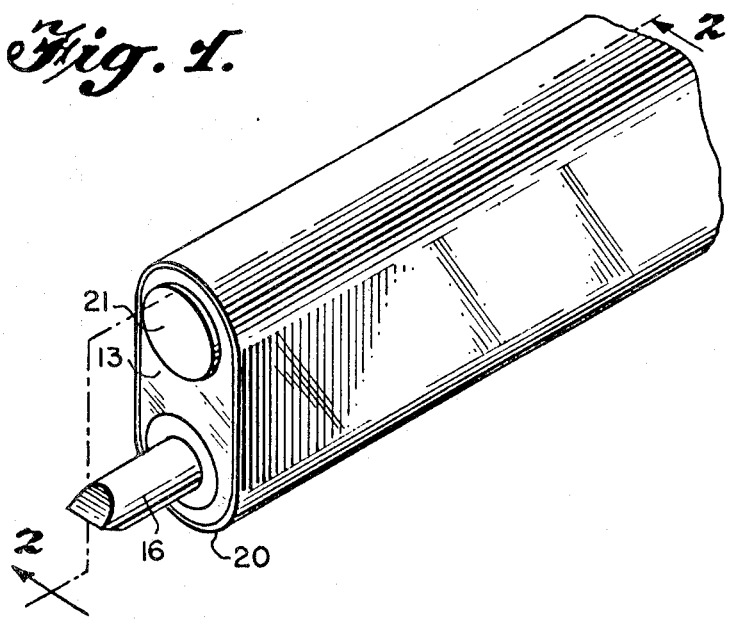
FIG. 1 is a perspective view of one end portion of the laser structure of the present invention.

As shown in the drawing, the laser system of the present invention comprises a laser rod 11 made of glass laser material. The laser rod 11 for example may be made of glass doped with neodymium. The rod 11 is mounted in an elongated glass matrix 13 which extends the length of the rod 11. The matrix is oval in cross section and the rod 11 is located on one side of the matrix. The matrix 13 is made of material which is lossy to light at the wavelength of the laser beam produced by the system but which will transmit light for pumping the laser material of the rod 11. The matrix material may for example by samarium-doped glass. Also, within the matrix 13 on the opposite side thereof from the glass rod 11 is an elongated flashlamp 15 for pumping the rod to excite the material thereof to a laser state. Contiguous to the rod 11 on the side adjacent the flashlamp 15, there is provided a sectionallike layer of transparent material 19 which arbitrarily can be lossy to the laser light wavelength and is light transmissive to the pump light.

Figure 2:
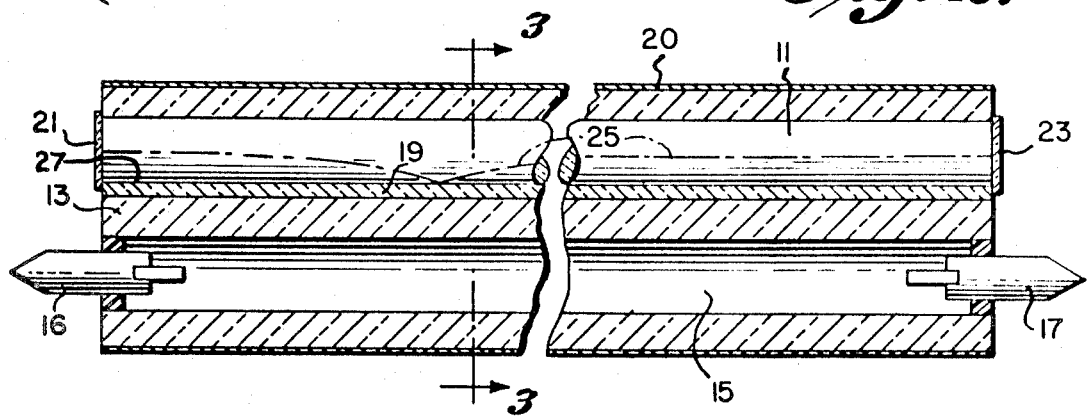
FIG. 2 is a longitudinal sectional view taken along the lines 2—2 of FIG. 1; and, FIG. 3 is a cross-sectional view taken substantially at the lines 3—3 of FIG. 2 and looking in the direction of the arrows.
Figure 3:
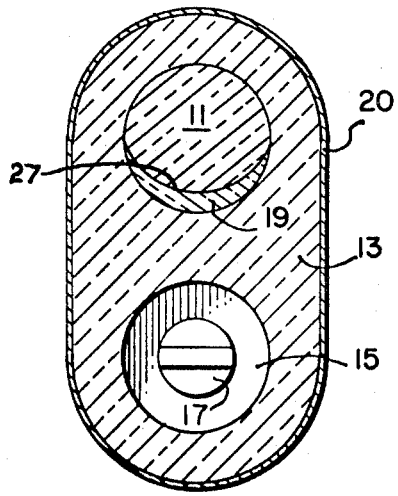

The section 19 may be considered to be part of the matrix 13 and may also be samarium-doped glass. The section 19 is selected to have an index of refraction lower than that of the rod 11 while the remainder of the glass matrix 13 is selected to have a higher index of refraction than that of the glass rod 11. The different indices of refraction in the section 19 and in the remainder of the matrix 13 are achieved by different levels of doping. The section 19 as illustrated in FIG. 2 extends throughout the length of the rod, and as illustrated in FIG. 3 is crescent shaped in cross section. The assembly of the rod 11, the section 19 and the remainder of the matrix are fused together to form a unitary composite structure. The outside wall of the matrix 13 is covered by a silver reflector 20 to reflect the pump light produced by the flashlamp 15 within the matrix. At opposite ends of the rod 11 are mirrors 21 and 23 defining the laser cavity of the system. The flashlamp 15 comprises a cylindrical bore through the matrix 13 extending parallel with the rod 11. The ends of the bore are closed and the bore is filled with an inert gas such as xenon or krypton. Electrode terminals 16 and 17 are mounted in opposite ends of the bore for passing an electric discharge through the inert gas to produce a high-intensity flash of light for pumping the laser rod 11. The material of the matrix is transmissive to the pump light produced by the flashlamp 15.

The above-described structure can be manufactured by cladding a rod of laser material with an annulus of transparent material having a lower index of refraction than the laser rod. A major portion of the cladding is then removed by cylindrical finishing on eccentrically positioned axis so that only the section 19 remains on one side of the rod. The resulting composite cylinder is then inserted into a cylindrical bore of a preshaped matrix body of higher index of refraction than the material of the laser rod and the assembly is fused together.

Pump light produced by the flashlamp 15 will illuminate the laser rod 11 and excite it to a laser state. When the laser material of the rod is excited to a laser state, it will emit light of a particular wavelength, which for neodymium-doped glass is normally 1.06 microns. When light of this wavelength travels through the laser material of the rod, it will stimulate further emission of light of this wavelength and the stimulated emission will be in phase with the stimulating light. As a result, light travelling through the rod will experience amplification. Emissions which are not travelling parallel with the axis of the rod will enter the selectively lossy material surrounding the rod and degenerate. However, those which travel parallel with the axis will be amplified throughout the length of the rod 11 and be reflected by the mirrors 21 and 23 for further amplification in the rod. As a result, standing waves of light energy called laser oscillations are set up within the rod 11. The mirror 23 is made partially transmissive so that some of the light energy from the laser oscillations are transmitted to the target.

When the flashlamp 15 pumps the rod 11 it also introduces heat into the rod 11. Because of the asymmetrical pumping arrangement inherent in the use of a single flashlamp, the side of the rod 11 nearer the flashlamp 15 will be heated to a greater degree than the side of the rod 11 further away from the flashlamp 15, and a temperature gradient will exist across the rod 11. Because of this temperature gradient, the side of the rod 11 nearer the flashlamp 15 will having a higher index of refraction than the side of the rod 11 further away from the flashlamp. As a result, a light ray travelling generally parallel to the axis of the rod 11 will be gradually bent toward the side thereof having the greater index of refraction or, in other words, will be bent toward the cladding section 19. Then the light ray impinges upon the interface 27 between the rod 11 and the cladding section 19, it will have a low angle of incidence. Because the section 19 has a lower index of refraction than that of the rod 11, the light ray will experience total internal reflection at the interface and, accordingly, will be reflected back up into the rod. The light ray then will again be bent parallel with the axis of the rod and finally bent again toward the section 19 of lower refractive index material where the ray will again experience total internal reflection. This bending of the light by the thermal gradient is gradual and continuous between successive reflections. Accordingly, a light ray will make numerous passes through the rod between reflections at the interface between the rod 11 and the section 19. In this manner, the laser light is trapped within the rod 11 by the combined effects of the gradient in the index of refraction and the total internal reflection at the interface between the rod 11 and the section 19 of lower index material. The dashed line 25 illustrates the path of a typical light ray travelling generally parallel to the axis of the rod 11. In this manner, the effect of the thermal gradient in the rod 11 is overcome and a highly efficient asymmetrically pumped laser rod system is provided. Moreover, the system will produce a beam having a minimum beam spread since off-axial light will still enter the cladding either directly or after one bounce from the interface between the rod 11 and the section 19.

The above description is of a preferred embodiment of the invention and many modifications may be made thereto without departing from the spirit and scope of the invention, which is defined in the appended claims.

Having described my invention, I claim:

1. A laser system including pumping means and laserable material comprising a rod of laser material, transparent selectively absorbing material surrounding said rod, the transparent selectively absorbing material adjacent to said rod on the one side thereof which is adjacent said pumping means having a lower index of refraction than that of said rod, the remaining transparent selectively absorbing material adjacent to said rod having an index of refraction at least as high as that of said rod.

2. A laser system as recited in claim 1 wherein said laser material is glass.

3. A laser system as recited in claim 1 wherein said remaining transparent selectively absorbing material has an index of refraction higher than the index of refraction of said rod.

4. A laser system as recited in claim 1 further comprising means to pump said rod asymmetrically.

5. A laser system as recited in claim 4 wherein said means to pump said rod comprises an elongated flashlamp extending parallel to said rod.

6. A laser system as recited in claim 5 wherein said transparent selectively absorbing material comprises a matrix enclosing both said flashlamp and said rod.

7. A laser system as recited in claim 6 wherein said matrix is covered with a reflector to reflect light within said matrix produced by said flashlamp.

8. A laser system comprising a rod of laser material, an elongated flashlamp extending parallel to said rod for pumping said rod, a light-transmissive matrix of selectively absorbing material surrounding said flashlamp and said laser rod, a section of said matrix adjacent to the side of said rod near said flashlamp having an index of refraction lower than that of said rod, the remainder of said matrix having an index of refraction at least as high as that of said rod.

9. A laser system as recited in claim 8 wherein said laser material is glass.

10. A laser system as recited in claim 8 wherein said remainder of said matrix has an index of refraction higher than said rod.

11. A laser system as recited in claim 8 wherein said matrix is covered with a reflecting layer to reflect light from said flashlamp back into said matrix and to said rod.

* * * * *